Jan. 3, 1967 V. T. JOHNSON 3,296,450
POWER GENERATING SYSTEM WITH CLOSED CIRCUIT COOLING
Filed Dec. 21, 1964 3 Sheets-Sheet 1

INVENTOR.
Victor T. Johnson
BY
Attorneys

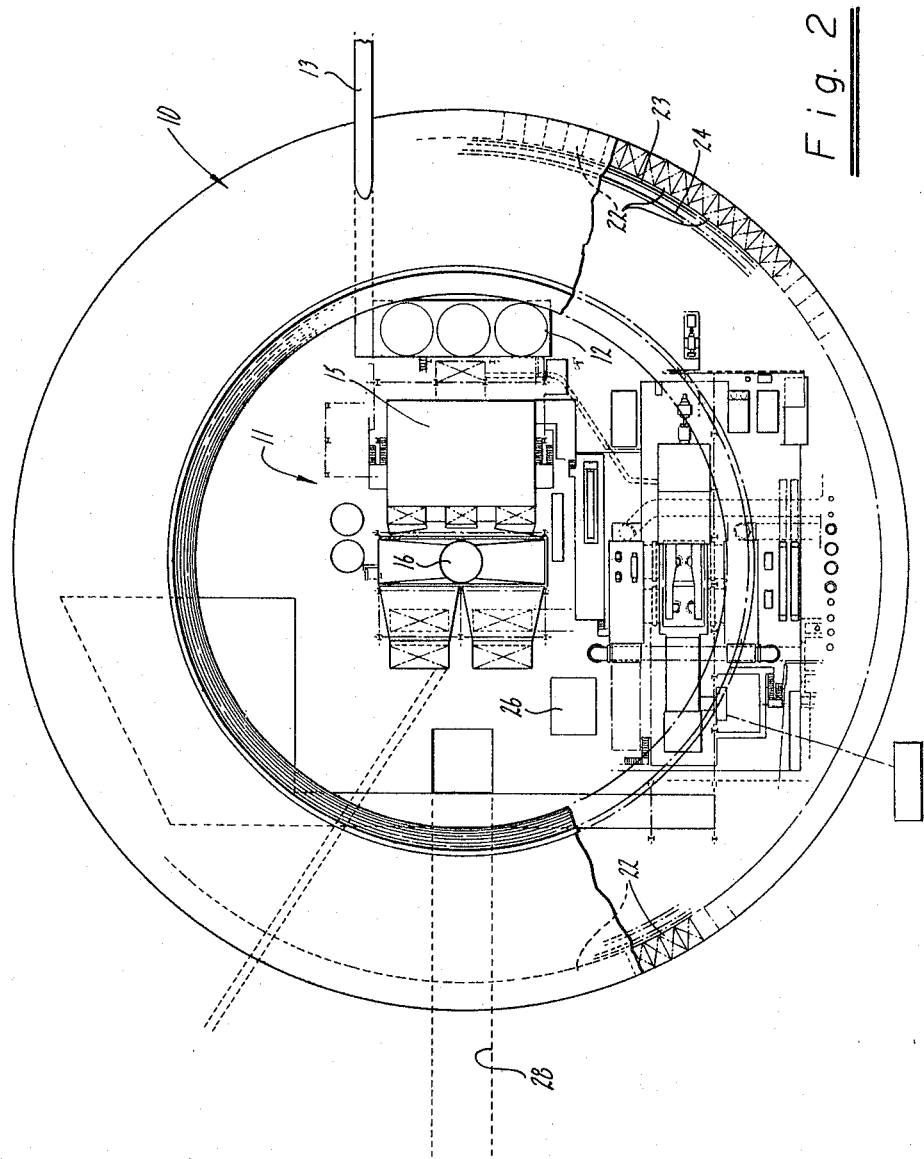

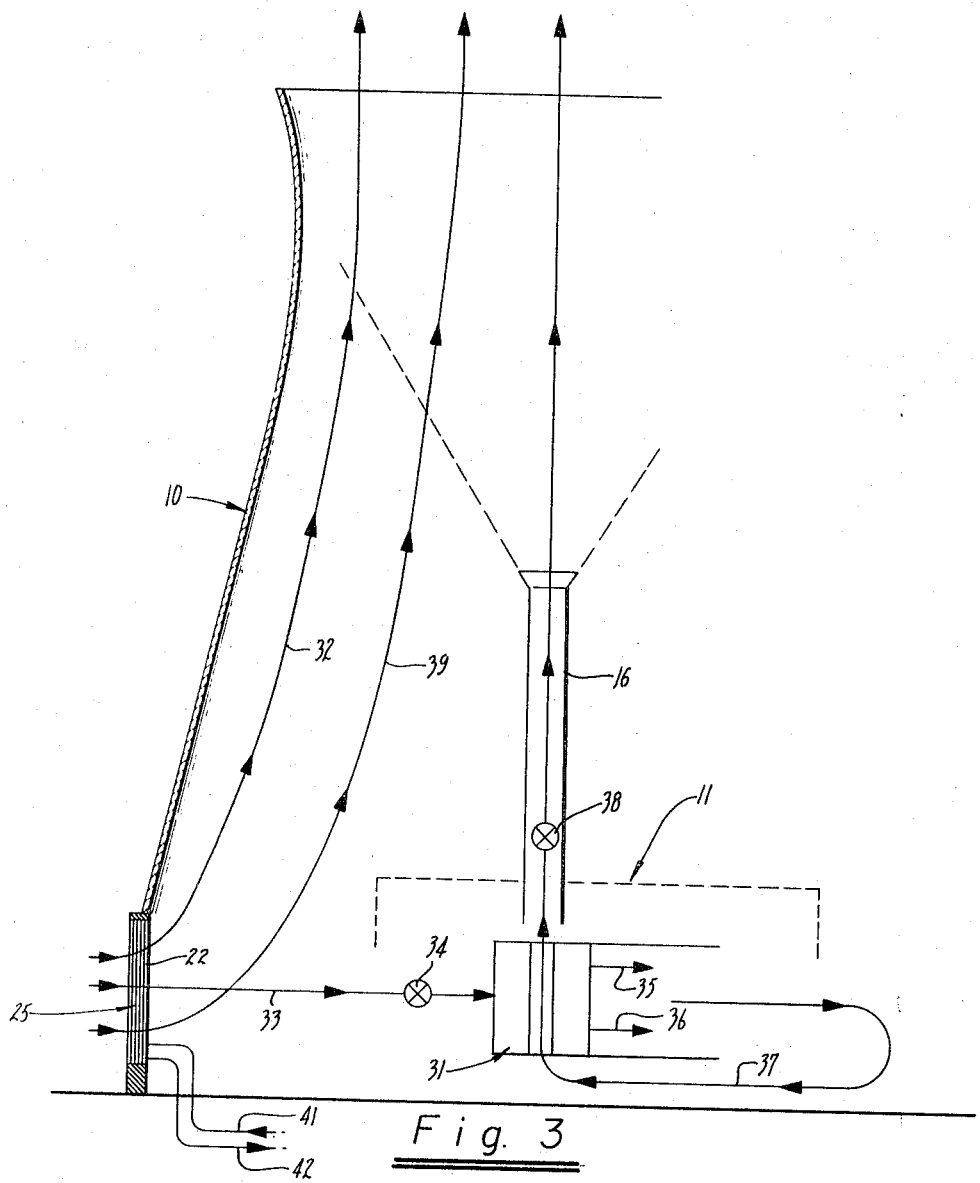

3,296,450
**POWER GENERATING SYSTEM WITH
CLOSED CIRCUIT COOLING**
Victor T. Johnson, Lafayette, Calif., assignor to Utah
 Construction & Mining Co., San Francisco, Calif., a
 corporation of Delaware
Filed Dec. 21, 1964, Ser. No. 419,746
5 Claims. (Cl. 290—2)

This invention relates generally to steam-electric power systems such as are commonly used for major generation of power.

The design and location of high capacity electric power plants involve consideration of various factors. Particularly, the steam-electric plants employed require a supply of steam condenser cooling water, which may be supplied by diversion from a convenient stream or lake. When such a natural source of water is not conveniently available, or where there may be restrictions on the quantity of water that is available for cooling, a closed circuit cooling system may be employed. This may be either a semi-closing wet system in which evaporation of water causes cooling, or a dry closed-cycle system in which the water is circulated through heat dissipating radiators. The radiators in turn are cooled by atmospheric air drawn or forced through the same, the draft being created either by means of a natural draft tower or by large fans driven by motors.

Power systems employing the closed-cycle dry cooling system may be located in arid regions, at or near sources of fuel, where it is impossible or impractical to obtain adequate amounts of water for either conventional wet cooling or cooling by recirculating water from a stream or lake. There are many potential plant sites in the United States and foreign countries where this condition exists, but where there are relatively inexpensive, large sources of fuel, such as lignite or coal.

With the exception of one closed-cycle dry-cooling system utilizing a natural draft hyperbolic tower, which at present serves a 120,000-kw. steam-electric unit in England, dry cooling system development throughout the world has been limited generally to generating units of less than 20,000 kw. in capacity. Most installations have involved use of an adaptation of traditional American fan driven induced-draft design which draws the ambient air through the radiators installed in a horizontal position at the bottom of each of many fan stacks. It is estimated that a dry-cooling system to serve a 100,000-kw. unit would require 1050 kw. of generating capacity to drive the fan motors, representing an investment of over $200,000 in generating capacity to serve this load.

In general, it is an object of this invention to utilize better the phenomenon of heat transfer and laws of thermodynamics to produce a novel power system having closed-circuit cooling that will enable steam-electric generating units of substantial size to be installed in arid regions.

A further object of the invention is to provide a power system of the above type which is characterized by effective and relatively efficient performance and which overcomes the limitations of the dry cooling systems referred to above. A feature of the present invention is that it utilizes a hyperbolic natural draft tower in a more effective and efficient manner by combining it physically with a steam-electric power plant.

Additional objects and features of the invention will appear from the following description in which the preferred embodiment has been set forth in detail in conjunction with the accompanying drawings.

Referring to the drawings:

FIGURE 2 is a plan view of FIGURE 1, with a part of the draft tower broken away; and FIGURE 3 is a schematic view illustrating certain parts of the system and their thermodynamic effects to increase the velocity and volume of air drawn through the air-cooled radiators.

Figure 1:
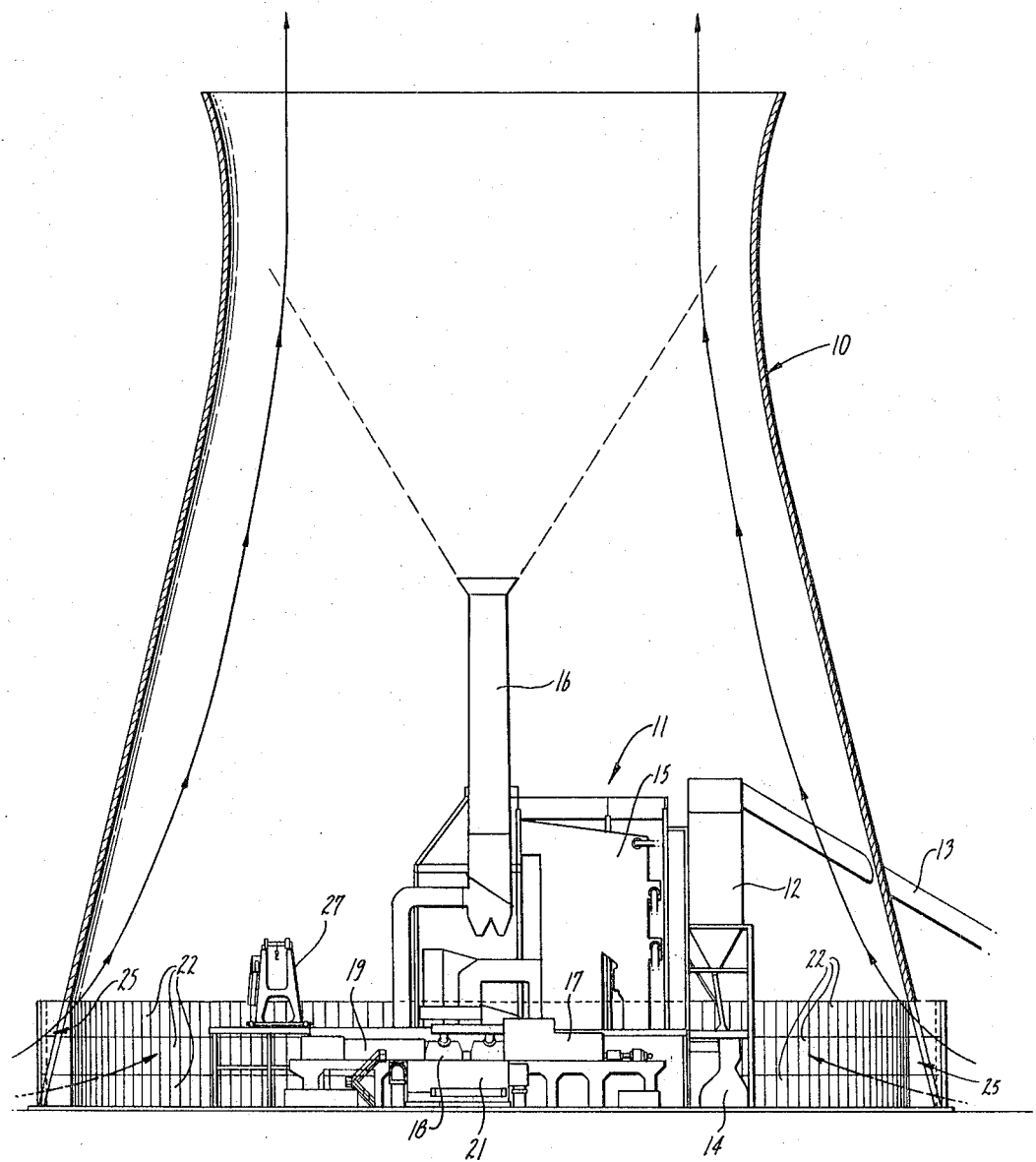
FIGURE 1 is a side elevational view, partly in section, schematically illustrating my system.

Described in general, my invention employs a complete, compact steam-electric plant which is installed within the lower periphery of a natural draft tower, preferably of the hyperbolic type. The purpose of this arrangement of the plant within the tower is described later in this specification. The closed-cycle dry-cooling system employed and its manner of operation are as follows: Steam discharged from the low pressure turbine exhausts into a jet, or a direct contact condenser, where it comes into contact counter-currently with a spray of cooled liquid condensate which converts the steam to hot liquid condensate which, in turn, flows into the condenser hotwell. Recirculating pumps remove the hot condensate continuously and pump a large portion of it to and through air-cooled radiators located around the base of the cooling tower. The discharged cooled condensate is then pumped back to the direct contact condenser where by means of spray heads located in the upper part of the condenser, the incoming steam is converted to hot condensate by the coolant condensate which absorbs the heat of vaporization from the steam.

A closed-cycle cooling system as described above utilizes the atmosphere as the heat sink. Heat from the hot condensate circulating through the finned radiators is rejected to the ambient air drawn in from outside of the tower which flows between the aluminum fins of the radiator. The heated air passes into the interior of the tower, is lifted upwards by convection currents, rises through the throat of the tower, where it increases in velocity, and is then discharged from the top of the tower into the atmosphere.

The power system illustrated in FIGURE 1 consists of a draft tower 10 which in this instance is of the hyperbolic type. Such towers are well known and may be several hundred feet in height, and several hundred feet in diameter at the base. For example, the diameter at the base may be 400 feet, the height about 475 feet, the opening diameter at the top about 275 feet, and the diameter of the throat about 250 feet.

A steam-electric power plant 11 is shown installed within the lower portion of the tower. This power plant can be of the type now being built for major electrical power generation. Assuming that it uses pulverized coal as a fuel, the plant includes the coal silos 12 which are supplied with coal by the conveyor 13 and which supply the pulverizers 14. Pulverized coal is supplied from the pulverizers to the usual furnace and fuel burning equipment of the steam generating unit 15. The gaseous products of combustion from the boiler furnace are delivered through suitable dust collecting means to the stack 16.

The steam driven prime mover used is represented in this instance by the high and lower pressure turbines 17 and 18. These turbines are mechanically connected to drive one or more electrical generators 19. Steam from the low pressure turbine 18 is delivered to the condenser 21. This condenser is of the water jet or direct contact type wherein cool liquid condensate directly impinges in spray form against the incoming steam.

High capacity compact steam-electric plants of the type used herein are being manufactured and installed by a number of companies in the United States. In the operation of such plants, combustion gases are discharged from the stack 16 at a relatively elevated temperature, as for example, from 250 to 325° F., depending on the sulphur content of the fuel. The velocity of the discharging stack gases, accelerated by an induced draft fan, is also relatively high, being of the order of from 75 to 100 feet per second or higher. For a coal burning plant having a rated capacity of 350,000 kw., the amount of air for burning the fuel may be of the order of 725,000 c.f.m. and the discharging stack gases may amount to over 670,000 c.f.m. (at 300° F.).

The heat exchanger system for the condenser water consists of radiators 22 which are disposed about the base area of the tower 10 in such configuration as to accord maximum frontal surface. The mechanical construction and general configuration for these radiators may vary in different installations. In general it is convenient to make them of aluminum in the form of panels, which can be connected to suitable inlet and return headers 23 and 24. These panels or radiators are distributed about the base whereby all of the air drawn into the tower through the base openings 25 is effectively brought into cooling contact with the metal heat exchanger fins of the panels. The inlet and outlet headers are connected in a circulating system including pumping means and connections to the condenser. In other words, the water in the cooling system is so circulated that hot condensate from the condensers is delivered to the radiator panels, where heat is dissipated and the temperature lowered, and then the cooled water is returned to the condenser.

It is desirable to design the piping system so that it can be sectionalized to take groups of radiators out of service during freezing weather. Reservoirs (not shown) are provided for storage of condensate drained from the out-of-service radiators during low ambient conditions. Such storage also provides surge and system make-up capacity.

In accordance with the present invention, the hot and relatively high velocity gases discharging from the stack are used to increase greatly the flow of cooling air through the radiators 22, for a tower of given dimensions. Thus, the upper end of the stack 16 is disposed to discharge gases upwardly toward the throat of the tower, whereby the discharging stack gases disperse laterally across the throat of the tower and are commingled with the upwardly moving air in the tower. The upper end portion 16a for the stack may be flared as illustrated, to somewhat increase the angle of the cone of dispersion, thereby providing a more even distribution of gases across the throat of the tower.

Within the cone of dispersion above the upper end of the stack 16, commingling of the hot, high velocity stack gases with the upwardly moving column of air in the tower serves to impart kinetic energy from the stack gases to the air, thus causing an aspirating action which increases the over-all amount of air drawn into the base portion of the stack and moving upwardly through the same. Stated another way, the aspirating action of the discharging stack gases serves to lower the static pressure below the cone of dispersion, thus increasing the pressure differential between the atmosphere and the interior of the base portion, whereby increased air flow occurs through the radiators. In addition to the aspirating action, heat exchange takes place between the hot stack gases and the cooler upwardly moving air, with the result that the air column in the upper part of the tower is increased in average temperature, and this likewise tends to increase the draft through the stack.

With respect to the location of the stack 16, its upper end should be at or near the center vertical axis of the tower and a substantial distance below the upper end of the tower and at such distance below the throat of a hyperbolic tower as to result in maximum draft conditions within the tower.

An auxiliary cooling system 29 is shown for cooling the lubricating oil supplied to the generator and turbine bearings, to ensure that the temperature of this oil will be maintained below 90° F. This refrigeration system can be of the vapor compression type, utilizing water vapor as the refrigerant and extracted steam from the turbine to operate the steam-jet booster.

It is deemed unnecessary to describe the additional pieces of equipment illustrated schematically in FIGURES 1 and 2 and which form part of the power plant 11. The nature and disposition of such auxiliary equipment will of course vary in different instances. It may be mentioned however that block 26 represents a control room, and device 27 represents a special crane for the handling of equipment and for repair purposes. To facilitate access and movement of equipment, one or more tunnels 28 can be provided which extend from the exterior of the tower, beneath the floor foundations, and then into the interior. Normally the tunnel doors are closed.

In general, the power plant should be so erected that it is grouped in a compact space within the lower portion of the tower, leaving sufficient space between the sides of the equipment and the walls of the tower adequate for free flow of air. In some instances, the plant may be installed before erection of the tower, while in other instances the tower may be erected and thereafter the pieces of equipment brought into the tower in sections of suitable size and then assembled.

FIGURE 3 schematically illustrates the flow of air and stack gases in the system. The power plant 11 in this instance is indicated as including a heat exchanger 31 for preheating combustion supporting air for the boiler furnaces. The air passing through the radiators 22 can be divided into one portion represented by line 32, which is the natural draft of the tower 10. A second portion represented by line 33 is delivered by forced draft fan 34 to the air preheater 31. Hot air from the air preheater comprises one portion 35 which is delivered to the furnace of the boiler for supporting combustion, and another portion 36 which passes to the coal pulverizer for drying of the coal. Gaseous products leaving the boiler furnace, represented by the line 37, pass through the heat exchanger 31, and thence are delivered to the stack 16. These gases are acted upon by induced draft fan 38, to induce the desired draft through the furnace. Line 39 represents the augmented flow through the radiators 22, which is obtained by virtue of the discharge of stack gases into the tower below the throat, in the manner previously described. Lines 41 and 42 represent respectively inflow of hot condensate from the condenser to the radiators 22, and flow of cool condensate from the radiators back to the condenser.

In effect, FIGURE 3 graphically illustrates the advantages obtained by my invention. The increased flow of cooling air through the radiators makes possible a steam-electric power system of greater capacity for a given size draft tower. Also it makes possible effective cooling of the condenser water in a dry closed circuit cooling system, which is suitable for use in arid regions where little if any water is available.

In the embodiment of the invention described above, the particular power plant mentioned is one using pulverized coal as a fuel. It will be evident, however, that the invention can be used with boilers fired with other types of fuel, as for example, fuel oil or natural gas. It is also possible to utilize the invention with plants having certain types of atomic reactors, such as the boiling water type, where the exhaust steam from the turbine is reduced to condensate form and recirculated through the reactor. Here the stack disposes of certain heated gases and emitted fission products to the atmosphere while the cooling of the condensate is accomplished, as previously described, by drawing ambient air through the radiator by convection.

I claim:
1. In a power generating system of the steam-electric type, a vertically extending draft tower, air cooled radiators located at the base of the tower, the base of the tower being formed whereby air flow into the tower occurs through the area occupied by the radiators, a steam-electric power plant located within the base portion of the tower, said plant including steam generating means together with an electrical generator and a prime mover driving the same and receiving steam from the steam generating means, said plant also including a steam condenser connected to receive exhaust steam from the prime mover and having a stack through which hot stack gases are discharged, and flow connections between the condenser and the radiators whereby condenser condensate is circulated through the radiators for cooling, said stack being disposed to discharge stack gases into the tower in an upward direction, the upper discharge end of the stack being located at a level below the throat of the tower.

2. A system as in claim 1 in which the tower is of the natural draft hyperbolic type, the upper end of the said stack being located at an optimum distance below the throat of the tower.

3. A system as in claim 1 in which the steam generating means includes a fuel fired furnace whereby the stack gases comprise gaseous products of combustion.

4. A system as in claim 1 in which the upper end of the stack has a flared portion to disperse the discharging stack gases.

5. A system as in claim 1 including means for delivering oil to the bearings of the turbines and in which refrigerating means is provided for cooling such oil.

References Cited by the Examiner
UNITED STATES PATENTS

| | | | |
|---|---|---|---|
| 2,124,395 | 7/1938 | Caughey | 253—39 |
| 2,336,641 | 12/1943 | Schlumbohm | 62—84 |
| 2,435,990 | 2/1948 | Weiler | 184—6 |
| 2,440,980 | 5/1948 | Sheppard | 184—6 |
| 2,693,248 | 11/1954 | Gaubatz et al. | 253—39 |
| 3,150,267 | 9/1964 | Caldwell | 290—2 |
| 3,171,258 | 3/1965 | Caldwell et al. | 60—95 |

MARTIN P. SCHWADRON, *Primary Examiner.*

R. R. BUNEVICH, *Assistant Examiner.*